(12) United States Patent
Sanchez

(10) Patent No.: US 6,910,140 B2
(45) Date of Patent: Jun. 21, 2005

(54) POWER SUPPLY MANAGEMENT DEVICE AND METHOD FOR A COMPUTER EQUIPMENT HAVING POWERED I/O PORTS IN STANDBY MODE

(75) Inventor: Samuel Navarro Sanchez, Grenoble (FR)

(73) Assignee: Hewlett-Packard Development, L.P., Houston, TX (US)

( * ) Notice: Subject to any disclaimer, the term of this patent is extended or adjusted under 35 U.S.C. 154(b) by 507 days.

(21) Appl. No.: 10/175,547

(22) Filed: Jun. 18, 2002

(65) Prior Publication Data

US 2002/0194514 A1 Dec. 19, 2002

(30) Foreign Application Priority Data

Jun. 18, 2001 (EP) .............................................. 01410072

(51) Int. Cl.[7] ................................................. G06F 1/28
(52) U.S. Cl. ....................... 713/321; 713/300; 713/320; 713/340
(58) Field of Search ............................... 713/300, 320, 713/321, 340

(56) References Cited

U.S. PATENT DOCUMENTS

| 4,349,879 | A | * | 9/1982 | Peddie et al. ............... 700/295 |
| 4,907,183 | A | | 3/1990 | Tanaka ......................... 364/707 |
| 5,189,589 | A | * | 2/1993 | Marschall ................... 361/93.2 |
| 6,064,260 | A | * | 5/2000 | Montgomery et al. ....... 330/127 |
| 6,243,831 | B1 | | 6/2001 | Mustafa et al. ................ 714/24 |

FOREIGN PATENT DOCUMENTS

WO    01/20433    3/2001

* cited by examiner

Primary Examiner—Rehana Perveen

(57) ABSTRACT

A computer equipment includes an electrically powered memory and a power supply conductor for at least one input/output port. During at least one mode of operation such as standby, said memory and said power supply conductor are connected to a common power supply unit, said power supply conductor being connected to said common power supply unit through a controlled switch turned on during that mode. A current drawn by another equipment connected to the input/output port might in such case cause a decrease of the output voltage of the common power supply unit, giving rise to a potential loss of contents of said memory. A power management device is provided that comprises a detector for detecting a value representative of the total current consumption through said power supply conductor and for turning off said controlled switch when said total current consumption exceeds a limit.

22 Claims, 1 Drawing Sheet

POWER SUPPLY MANAGEMENT DEVICE AND METHOD FOR A COMPUTER EQUIPMENT HAVING POWERED I/O PORTS IN STANDBY MODE

The present invention generally relates to power supply management in electronic equipment such as personal computers or the like. More particularly, although not exclusively, the present invention relates to a power control system and method for avoiding loss of memory contents in standby mode of a computer in the event of excessive voltage drop on a power supply line powering the memory chips.

BACKGROUND OF THE INVENTION

When computer equipment is brought into standby mode (known in the art as the "S3" mode), the working memory (RAM) of the computer is kept powered so as to preserve the data therein ready for a next power-up of the computer The RAM is conventionally powered in the S3 condition by a specific power source, or "standby rail". Computer equipment is generally provided with input/output (I/O) ports including a power supply conductor for powering peripheral devices connected to such ports. The same standby rail which powers the RAM is also conventionally used for providing power to these I/O ports. This is also typically the case for Universal Serial Bus (USB) ports, which need to have power active during the standby mode of the computer.

In such a situation, that is, when a USB peripheral device is connected to a USB port, the peripheral can draw significant current from the power conductor of said port On the other side, the standby rail of a conventional computer is typically capable of delivering a current of 1 or 2 Amps. this value being primarily governed by the current which is drawn by the RAM chips during S3 mode.

Therefore, should a USB peripheral draw a high current from the USB port, this can cause the standby rail voltage to drop, to the extent that the RAM chips will be no longer properly powered and data stored therein will be lost.

It has been proposed to provide dedicated power supply chips for handling such situations in relation to USB ports or in other environments. Such solutions are however expensive as they are based on a per-port approach. Thus that if the number of I/O ports is increased, and given that there is nowadays a tendency to provide personal computers with 6 or 8 USB ports or even more, the number of dedicated supply chips also has to be increased. This is costly and additionally requires appropriate room on the USB board or mother board.

A further drawback of these known supply chips is that they individually act as current limiters, without taking into account the fact that a plurality of USB ports may altogether draw a cumulative current that will still cause the voltage source to drop and cause loss of RAM contents.

Therefore, this known technique is expensive and cumbersome while falling to safely prevent data losses, in particular when numerous USB ports are provided.

SUMMARY OF THE INVENTION

According to a first aspect, the present invention provides a power management device for computer equipment including electrically powered memory and a power supply conductor for at least one input/output port, wherein during at least one mode of operation of the computer equipment, said memory and said power supply conductor are connected to a common power supply unit, said power supply conductor being connected to said common power supply unit through a controlled switch which is closed during that mode, wherein said power management device includes a detector adapted to detect a value representative of the total current consumption through said power supply conductor and to open said controlled switch when said total current consumption exceeds a limit.

The present invention provides, according to a second aspect, computer equipment including a CPU, an electrically powered memory, a common power supply unit, a power supply conductor associated with at least one input/output port of the computer equipment, a controlled switch connected between said common power supply unit and said power supply conductor, wherein during at least one mode of operation of the equipment, said controlled switch is closed and said memory and said power supply conductor are connected to said common power supply unit, said computer equipment further including a power management device including a detector adapted to detect a value representative of the total current consumption through said power supply conductor and to opening said controlled switch when said total current consumption exceeds a limit.

Preferred but non limiting features of the power supply management device and computer equipment as defined above are as follows:

said memory is RAM, said mode of operation is a standby mode, and said common power supply unit is a standby power supply unit.

said controlled switch has an on-state internal resistance, and said detector is adapted to determine when a voltage drop across said controlled switch exceeds a given threshold.

said detector comprises a voltage divider for generating a predetermined fraction of the output voltage of said common power supply unit, and a comparator receiving on one input said predetermined voltage fraction and on another input the voltage at the power supply conductor.

a logic gate is provided for combining an output signal of said comparator and a standby mode control signal generated by a control logic, an output of said logic gate being connected for controlling said controlled switch.

said voltage divider has a first mode of operation where it generates a first voltage fraction and a second mode of operation where it generates a second voltage fraction lower than said first voltage fraction.

said first voltage fraction is generated while said comparator detects no excess current consumption and said second voltage fraction is generated while said comparator detects said excess current consumption.

said voltage divider comprises first and second resistors forming a divider bridge, the midpoint of which is connected to said one input of said comparator, and a third resistor connected between said one input and the output of comparator.

According to a third aspect, the present invention provides, in computer equipment including a CPU, an electrically powered memory, a common power supply unit, a power supply conductor associated with at least one input/output port of the equipment, a controlled switch connected between said common power supply unit and said power supply conductor, wherein during at least one mode of operation of the computer equipment, said controlled switch is closed and said memory and said power supply conductor are connected to said common power supply unit: a method for managing power supply to said memory and said power supply conductor, the method comprising the steps of:

detecting a value representative of the total current consumption through said power supply conductor, and opening said controlled switch when said total current consumption exceeds a limit.

Preferred aspects of the above method are as follows:

said memory is a RRM memory, said mode of operation is a standby mode, and said common power supply unit is a standby power supply unit.

said controlled switch has an on-state internal resistance, and said detecting step comprises determining when a voltage drop across said controlled switch exceeds a given threshold.

said determination comprises generating a predetermined fraction of the output voltage of said common power supply unit and comparing said predetermined voltage fraction with the voltage at the power supply conductor.

the method further comprises the step of logically combining a signal generated from said comparison with a standby mode control signal generated by a control logic of the equipment, and controlling said controlled switch with an output of said logic gate.

the method further comprises the step of lowering said voltage fraction once an excess current consumption has been detected.

BRIEF DESCRIPTION OF THE DRAWINGS

A preferred but non-limiting embodiment, or example, of the present invention will now be described in detail with reference to the appended drawing, in which.

DETAILED DESCRIPTION OF THE PREFERRED EMBODIMENT

Figure 1:
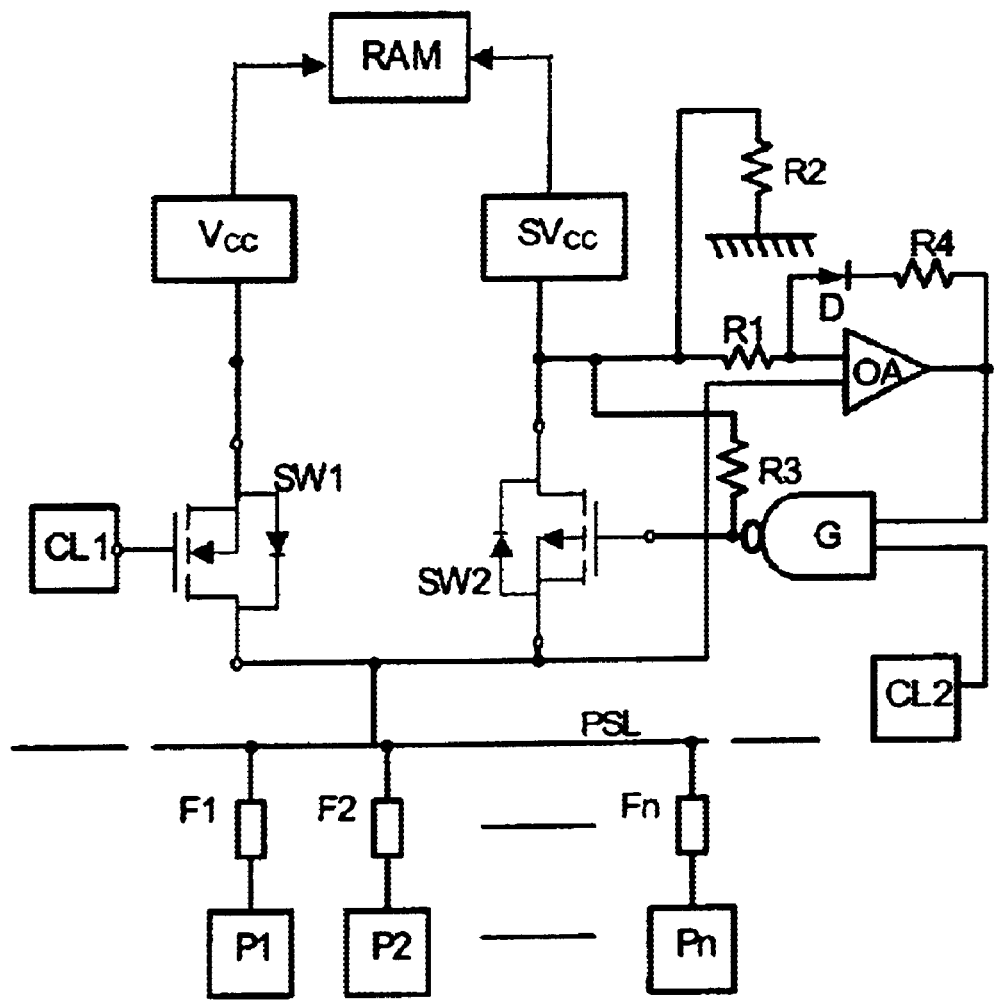
FIG. 1 is a schematic diagram of a power supply management circuit.

Referring to FIG. 1, a circuit is shown which comprises a main power supply control switch SW1, (here, preferably in the form of a N-MOS transistor), the base of which is connected to the output of a control logic circuit CL1. This controls the switch SW1 according to the status of a computer equipment (on, standby, off, etc.), in a known manner.

The switch SW1 is connected between a main power supply source vcc (typically +5 V=) and a power supply line PSL connected to a plurality of USB ports P1 to Pn of the computer equipment through respective circuit breakers F1 to Fn.

A second switch SW2, typically a P-MOS transistor, is connected between a standby power supply source SVcc (also typically +5 V=) and the power supply line PSL.

The main power supply Vcc is used by the computer equipment during its normal operation. In that case, switch SW1 is closed to connect the source to the power supply line PSL, while other parts of the equipment are connected to the same source (not shown).

Also in known manner, the standby power source Svcc is used by the computer equipment in standby (or "S3") mode for the main following purposes:

powering electrically powered working memory RAM of the computer (see FIG. 1) which in such condition has to continue storing the data and programs which were residing in said RAM at the time standby mode was activated;

providing limited power to any USB device (or other peripheral devices) which is or will be connected to the computer equipment during standby mode. Such power is necessary, for example, for a computer keyboard to remain active during standby mode. This allows a user to bring the equipment back to active mode by pressing a keyboard key. Power is also necessary to accomodate any other computer tasks that are to be performed in standby mode.

A resistor divider bridge R1, R2 is connected between SVcc and ground, and the middle point of this bridge is connected to the inverting input of an operational amplifier OA serving as a comparator. The non-inverting input of comparator OA is directly connected to the power supply line PSL. A diode D and a resistor R4 is connected in series between the inverting input or comparator OA and its output.

The output of comparator OA is also connected to a first input of an NAND gate G, the second input of which is connected to a control logic circuit CL2 (CL2=CL1#). This outputs a logic signal which varies according to the status of the computer equipment (on, standby, off, etc.).

The output of gate G is connected to a pull-up resistor R3 and drives the base of a second switch SW2 so as to turn it on or off according to specific given conditions as will be explained.

The circuit operates as follows.

When the computer equipment is in normal activity (the "S0" state), the control logic CL1 continuously applies to the base of SW1 a signal with a high logic level so as to keep it turned on (i.e. closed).

In these circumstances, the Vcc power supply source is connected to the power supply line PSL of the USB ports so as to power USB devices as necessary. The RAM is also powered by Vcc (not shown).

When the computer equipment is brought into standby, or S3, mode, the control logic CL1 applies a low logic signal to switch SW1, and at the same time the control logic CL2 applies a high logic signal to the corresponding input of NAND gate G. Assuming that the other input of gate G is at that time at a high logic level, then gate G applies to the second switch SW2 a low logic signal which turns SW2 on (i.e. closed). As a consequence, the power supply line PSL of the USB ports is powered by the standby voltage supply SVcc.

The values of R1 and R2 are selected so as to apply to the inverting input of OA, a voltage equal to a given fraction of SVcc. The voltage drop through SW2 will depend on its ON state resistance (Rdson). The maximum allowed voltage drop through SW2 will be equal to Rdson multiplied by the maximum allowed current (Imax). Therefore, we will use the following formula: $(SVcc \times R2)/(R1+R2) = Svcc - Imax \times Rdson$ e.g. 0.95 times SVcc, i.e. 4.75 volts in the present example.

So long as the voltage at the power supply line PSL remains above 4.75 volts, the comparator OA keeps outputting a high logic signal, so that gate G keeps outputting a low logic signal, whereby switch SW2 remains turned on and the loads in the USB devices are properly powered.

As soon as a USB device draws a high current from standby voltage source SVcc through the power supply line PSL, the voltage drop across switch SW2 due to its conducting resistance Rdson increases. Thus the voltage at supply line PSL will decrease. When this voltage drops below the threshold value of 4.75 volts, comparator OA delivers a low logic signal, whereby gate G applies to second switch SW2 a high logic signal which turns the latter off (i.e. opens it). The power supply line is therefore no longer connected to the power supply source SVcc, so that no USB device can longer draw any current. As a consequence, the risk that the standby power supply voltage drops to a level insufficient for ensuring proper RAM operation is avoided. Thus the RAM contents of the computer equipment is preserved.

It should be noted here that this power line supply shutdown is not reversible. More particularly, as soon as the switch SW2 is turned off as explained above, the voltage at the power supply line PSL goes to a level of zero (ground) or close to zero, so that the output of comparator OA remains at low level and SW2 remains turned off. This in particular avoids the safety PSL shutdown process entering into undesirable oscillation.

When the computer equipment in standby mode is brought back to normal active mode, the control logic circuit CL2 generates a low logic signal and control logic circuit CL1 delivers a high logic signal. Therefore, switch SW2 is opened (or remains off if the safety turning off as described above did occur) and switch SW1 is closed, whereby the power supply line PSL is again powered from voltage source Vcc for normal activity through SW1.

It should be noted here that there are situations where, at the initial power-up of the computer equipment, the actual value of Vcc can be somewhat lower than the nominal value of 5 volts This may be caused by sharp current demand from the various parts of the computer on power-up, or because the tolerance on +5V rail is higher (typically +/−10%) than tolerance on stby rail (typically +/−1%). In this last case, we could have +5V at a value of 4.5V, and +5Vstby at +5.05V.

In this case, diode D and resistor R4 connected between the output of comparator OA and its inverting input make the circuit behave as follows: as soon as the output of comparator OA has gone to the zero logic level (i.e. substantially to ground), causing power supply line shutdown as explained above, the divider bridge R1, R2 is affected by R4 being connected in parallel with R2, so that the reference voltage at the inverting input of comparator OA decreases to a lower reference voltage. For example, the value of R4 can be selected to as to have a lower reference voltage approximately equal to 4.3 volts.

In that case, when the main power supply Vcc is switched on again, even if the initial value of Vcc is quite low, and typically between 4,5 volts and its nominal value, the output of comparator OA will safely return to high logic level. In this manner, when the equipment enters again into standby mode (i.e. control logic CL2 delivers a high logic signal) the NAND gate G will deliver a low logic circuit Thus switch SW2 will be effectively turned on.

Although the invention has been described by way of example and with reference to particular embodiments it is to be understood that modification and/or improvements may be made without departing from the scope of the appended claims.

Where in the foregoing description reference has been made to integers or elements having known equivalents, then such equivalents are herein incorporated as if individually set forth.

What is claimed is:

1. A power management device for computer equipment including electrically powered memory and a power supply conductor for at least one input/output port, wherein during at least one mode of operation of the computer equipment, said memory and said power supply conductor are connected to a common power supply unit, said power supply conductor being connected to said common power supply unit through a controlled switch closed during that mode, wherein said power management device includes a detector adapted to detect a value representative of the total current consumption through said power supply conductor and to open said controlled switch when said total current consumption exceeds a limit.

2. A power supply management device according to claim 1, wherein said memory is RAM, said mode of operation corresponds to a standby mode, and said common power supply unit is a standby power supply unit.

3. A power supply management device according to claim 1, wherein said controlled switch has an on-state internal resistance, and said detector is adapted to determine when a voltage drop across said controlled switch exceeds a given threshold.

4. A power supply management device according to claim 3, wherein said detector comprises a voltage divider adapted to generate a predetermined fraction of the output voltage of said common power supply unit, and a comparator receiving on one input said predetermined voltage fraction and on another input the voltage at the power supply conductor.

5. A power supply management device according to claim 4, further including a logic gate which receives as input an output signal of said comparator and a standby mode control signal generated by a control logic, an output of said logic gate being connected so as to control said controlled switch.

6. A power supply management device according to claim 4, wherein said voltage divider has a first mode of operation whereby it generates a first voltage fraction and a second mode of operation where it generates a second voltage traction lower than said first voltage fraction.

7. A power supply management device according to claim 6, wherein said first voltage fraction is generated while said comparator detects no excess current consumption and said second voltage fraction is generated while said comparator detects said excess current consumption.

8. A power supply management device according to claim 7, wherein said voltage divider comprises first and second resistors forming a divider bridge, the midpoint of which is connected to said one input of said comparator, and a third resistor connected between said one input and the output of comparator.

9. A computer, including a CPU, an electrically powered memory, a common power supply unit, a power supply conductor associated with at least one input/output port of the computer equipment, a controlled switch connected between said common power supply unit and said power supply conductor, wherein during at least one mode of operation of the equipment, said controlled switch is closed and said memory and said power supply conductor are connected to said common power supply unit, said computer further including a power management device including a detector adapted to detect a value representative of the total current consumption through said power supply conductor and to open said controlled switch when said total current consumption exceeds a limit.

10. A computer according to claim 9, wherein said memory is RAM, said mode of operation corresponds to standby mode, and said common power supply unit is a standby power supply unit.

11. A computer according to claim 9, wherein said controlled switch has an on-state internal resistance, and said detector is adapted to determine when a voltage drop across said controlled switch exceeds a given threshold.

12. A computer according to claim 11, wherein said detector comprises a voltage divider for generating a predetermined fraction of the output voltage of said common power supply unit, and a comparator receiving on one input said predetermined voltage fraction and on another input the voltage at the power supply conductor.

13. A computer according to claim 12, further comprising a logic gate which receives as input an output signal of said comparator and a standby mode control signal generated by a control logic, an output of said logic gate being connected so as to control said controlled switch.

14. A computer according to claim 12, wherein said voltage divider has a first mode of operation where it generates a first voltage fraction and a second mode of operation where it generates a second voltage fraction lower than said first voltage fraction.

15. A computer according to claim 14, wherein said first voltage fraction is generated while said comparator detects no excess current consumption and said second voltage fraction is generated while said comparator detects said excess current consumption.

16. A computer according to claim 15, wherein said voltage divider comprises first and second resistors forming a divider bridge, the midpoint of which is connected to said one input of said comparator, and a third resistor connected between said one input and the output of comparator.

17. A method of operating a computer, the computer including a CPU, an electrically powered memory, a common power supply unit, a power supply conductor associated with at least one input/output port of the equipment, a controlled switch connected between said common power supply unit and said power supply conductor, wherein during at least one mode of operation of the computer equipment, said controlled switch is closed and said memory and said power supply conductor are connected to said common power supply unit: a method for managing power supply to said memory and said power supply conductor, the method comprising the steps of:

detecting a value representative of the total current consumption through said power supply conductor, and opening said controlled switch when said total is current consumption exceeds a limit.

18. A method according to claim 17, wherein said memory is RAM, said mode of operation is a standby mode, and said common power supply unit is a standby power supply unit.

19. A method according to claim 17, wherein said controlled switch has an on-state internal resistance, and said detecting step comprises determining when a voltage drop across said controlled switch exceeds a given threshold.

20. A method according to claim 19, wherein said determination comprises generating a predetermined fraction of the output voltage of said common power supply unit and comparing said predetermined voltage fraction with the voltage at the power supply conductor.

21. A method according to claim 20, further comprising the step of logically combining a signal generated from said comparison with a standby mode control signal generated by a control logic of the equipment, and controlling said controlled switch with an output of said logic gate.

22. A method according to claim 20, further comprising the step of lowering said voltage fraction once an excess current consumption has been detected.

* * * * *